Sept. 21, 1926.

G. W. CHALMERS 1,600,452

CAN FEEDING MECHANISM

Filed Sept. 30, 1925   5 Sheets-Sheet 1

Inventor
George W. Chalmers
Barnett ...
Attorneys.

Sept. 21, 1926.  
G. W. CHALMERS  
CAN FEEDING MECHANISM  
Filed Sept. 30, 1925
1,600,452
5 Sheets-Sheet 2
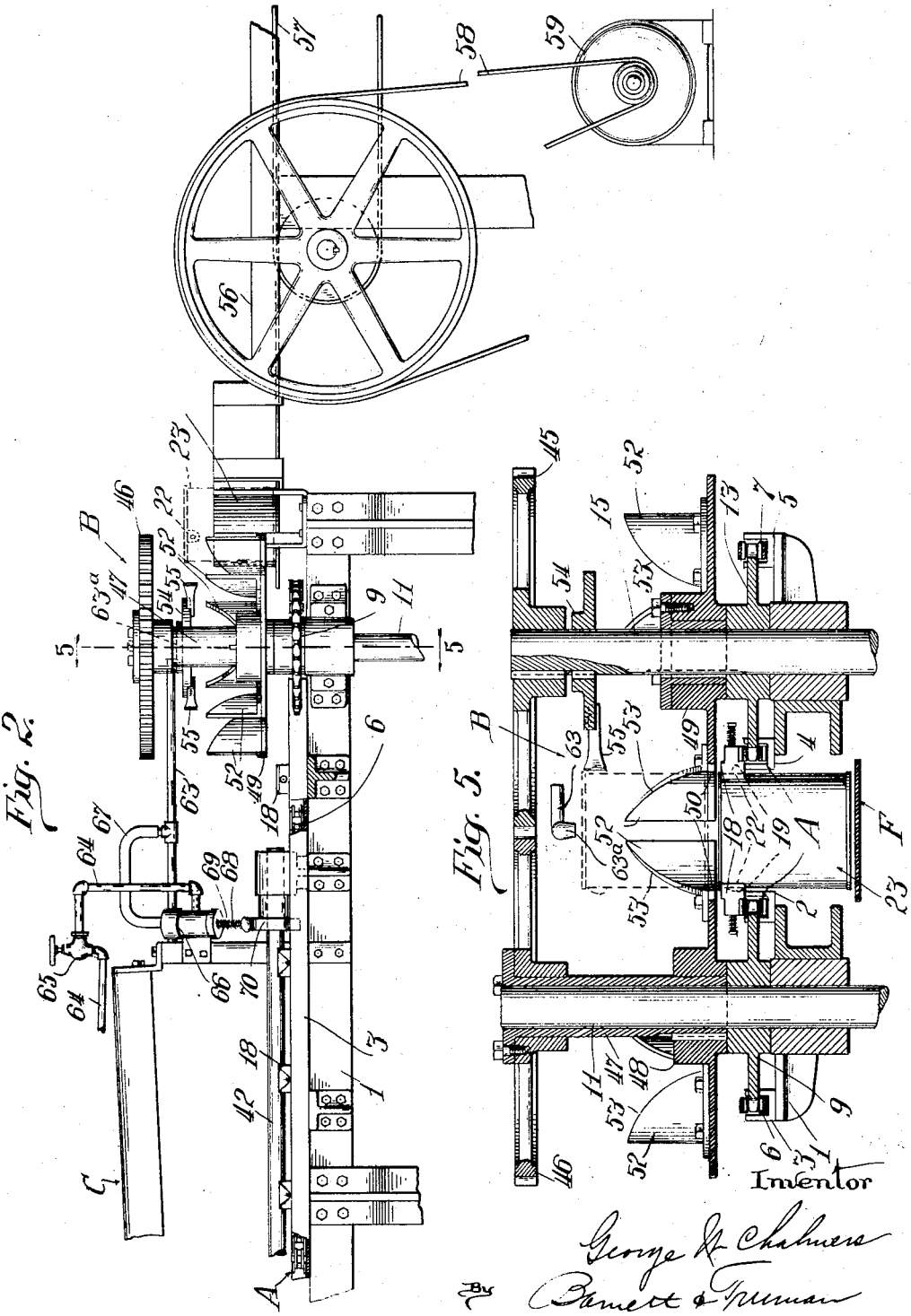

Sept. 21, 1926.
G. W. CHALMERS
CAN FEEDING MECHANISM
Filed Sept. 30, 1925
1,600,452
5 Sheets-Sheet 3
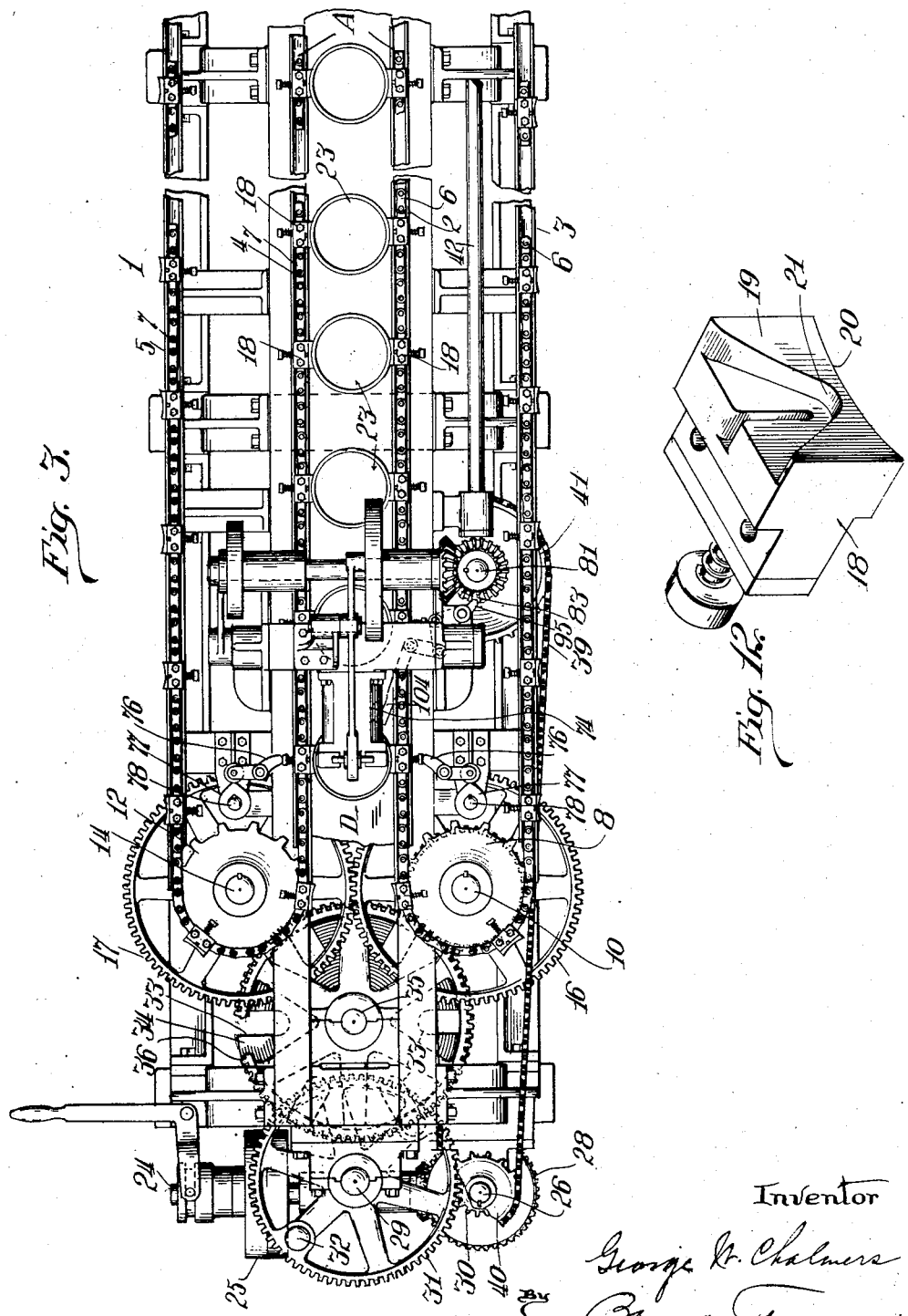
Inventor
George W. Chalmers
Attorneys.

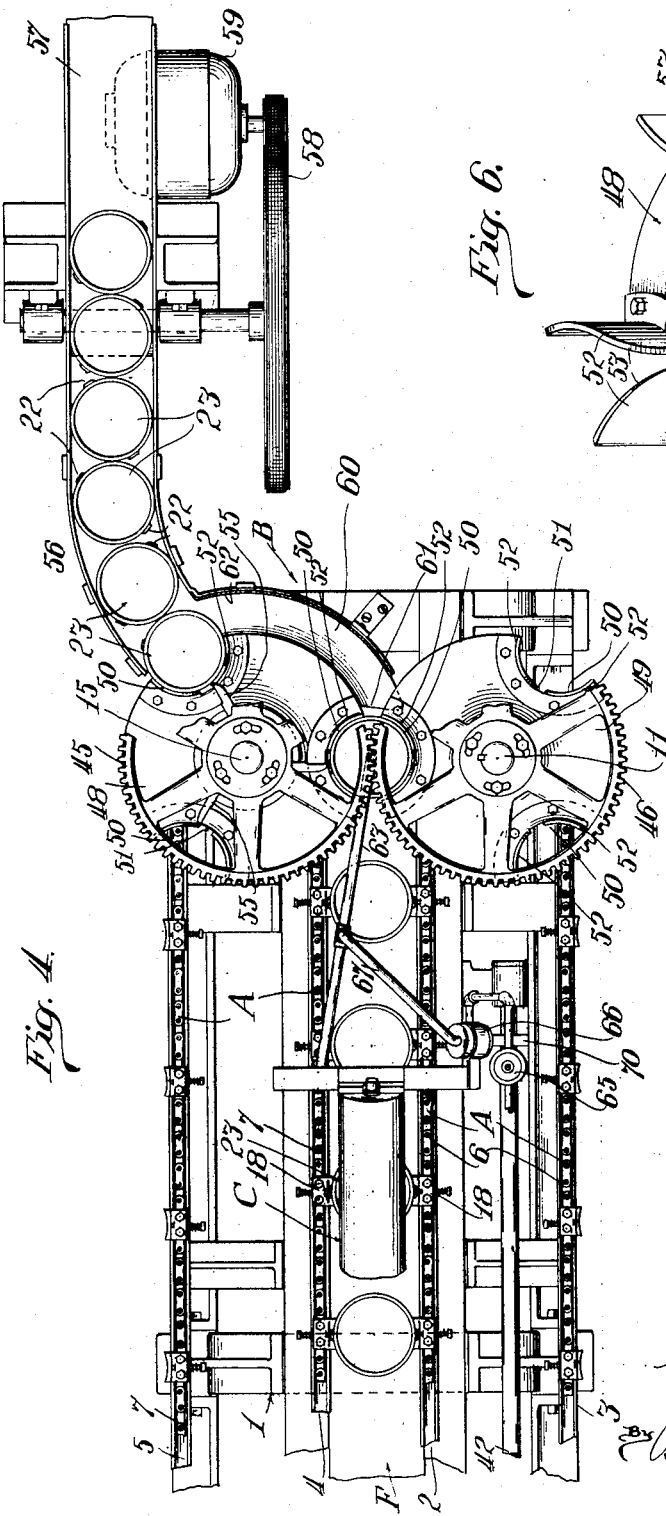

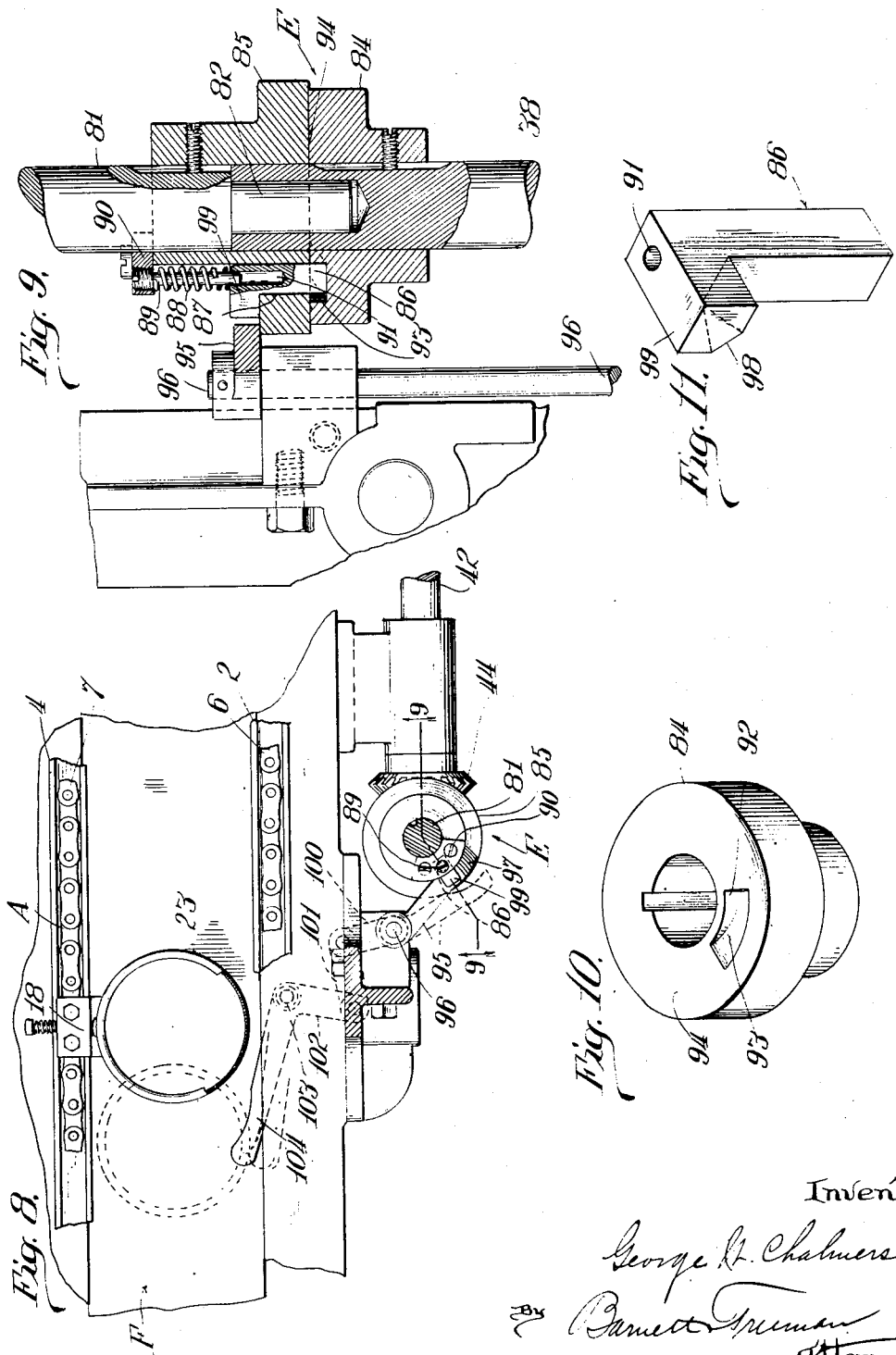

Patented Sept. 21, 1926.

1,600,452

UNITED STATES PATENT OFFICE.

GEORGE W. CHALMERS, OF SUMMIT, ILLINOIS, ASSIGNOR TO INTERNATIONAL PATENTS DEVELOPMENT COMPANY, OF WILMINGTON, DELAWARE, A CORPORATION OF DELAWARE.

CAN-FEEDING MECHANISM.

Application filed September 30, 1925. Serial No. 59,590.

This invention relates to a machine for automatically positioning bails on cans or similar receptacles, the can being provided with recesses or ears for receiving the hooked ends of the bails.

After a can has been provided with a diametrically opposed pair of recesses or holes near its upper edge, or with bail-ears provided with such recesses, it is necessary to spring into place a bail having inturned hooked ends which engage in these recesses. The present invention relates to certain improvements in a machine for automatically positioning these bails in the bail ears or recesses of the cans.

One object of the present invention is to provide an improved means for delivering cans to the conveyor which successively advances these cans, one by one, to the bail-receiving station where the bail-placer operates. This can-feeding means is adapted to receive a continuous stream of cans from a belt conveyor or similar delivering means, rotate each can until its ears are in proper position to register with the ear-receiving pockets on the conveyor, and to deliver this can to a pair of pockets, when these pockets are brought to rest at the can-receiving station. If the cans are imperfect or the ears are not properly positioned on the can, the can will be rejected.

Another object is to provide improved driving connections to the bail-placer, including a clutch which is automatically thrown out to temporarily disable the bail-placer whenever a can is not moved into bail-receiving position. In other words, if for any reason the can-feeding means has failed to position a can in a pair of ear-holding pockets, the clutch will be automatically disconnected when the empty pockets come into register with the bail-placer, so that no operation of the bail-placer will take place until the next can is moved to the bail-receiving station.

Other objects and advantages of the invention will be apparent from the following detailed description of one approved form of the apparatus.

In the accompanying drawings:

Fig. 2 is a side elevation of the other end of the apparatus, including the can-feeding mechanism. Fig. 2 is substantially a continuation of the right-hand end of Fig. 1.

Figs. 3 and 4 are substantially plan views of the mechanism shown in Figs. 1 and 2 respectively.

Fig. 5 is a transverse vertical section, on a enlarged scale, taken substantially on the line 5—5 of Fig. 2.

Figs. 6 and 7 are perspective views of details of the can-feeding mechanism.

Fig. 8 is a plan view of the stop mechanism in the driving connections to the bail-placer.

Fig. 9 is an enlarged vertical section taken substantially on the line 9—9 of Fig. 8.

Fig. 10 is a perspective view of the lower clutch member.

Fig. 11 is a perspective view of the clutch pin, and

Fig. 12 is a perspective view of one of the ear-supporting pockets of the can conveyor.

Figure 1:
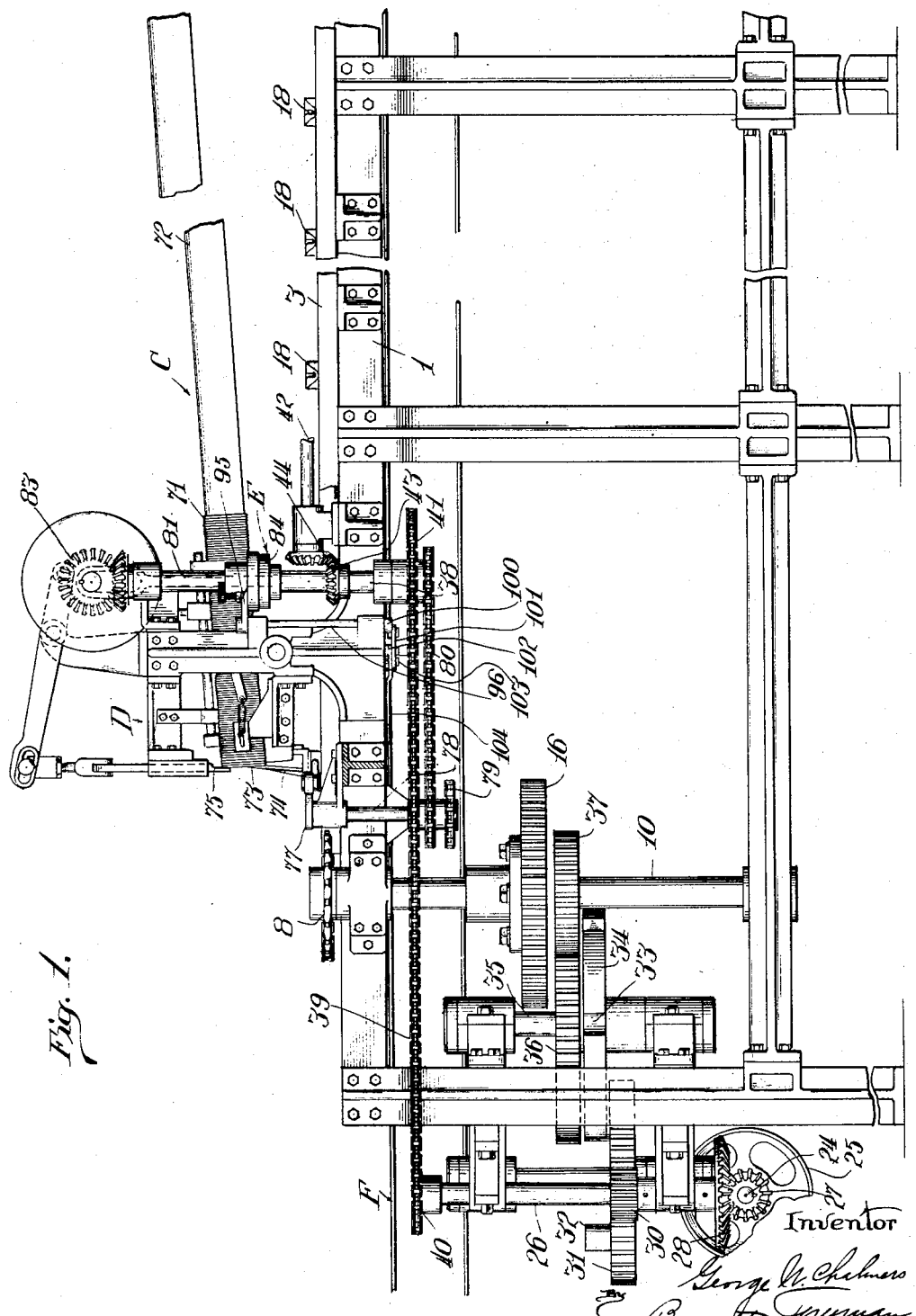
Fig. 1 is a side elevation of that end of the apparatus including the bail-placer.

The entire apparatus may be considered as composed of the following cooperating mechanisms: A conveyor A for holding the cans by their ears and moving them intermittently from one station to another through the apparatus; a mechanism B for feeding the cans to this conveyor; a mechanism C for feeding bails to the bail-placing station; a mechanism D for positioning these bails in the can ears; driving connections for the bail-placer D, including an automatic stop mechanism E; and a conveyor F for carrying away the assembled cans. An apparatus comprising a similar combination of elements is disclosed and claimed in the copending application of Chalmers and Wilson, Serial No. 7058, filed February 5, 1925, (now Patent No. 1,575,037, granted March 2, 1926).

The present machine is designed as an improvement on the apparatus disclosed and claimed in this former application. The parts A, C, D and F of the present improved apparatus are substantially the same as those disclosed and claimed and described in greater detail, in the prior application referred to hereinabove. A new and improved type of can-feeder B is herein disclosed, and the automatic stop mechanism E has been added to prevent the bail-placer D from functioning when the can-feeder B has failed, for any reason, to properly position a can in the conveyor A.

In the upper portion of the supporting framework 1, are arranged four similar parallel, horizontal channels or guideways 2, 3, 4 and 5. The inner and outer runs of a looped conveyor chain 6 are supported and guided by the runways 2 and 3, respectively, and a similar conveyor chain 7 is supported in the runways 4 and 5. The looped ends of chain 6 are carried by sprocket wheels 8 and 9, mounted on vertical shafts 10 and 11, respectively. Chain 7 is similarly supported on sprocket wheels 12 and 13 mounted on vertical shafts 14 and 15, respectively. By means of the intermeshing gear wheels 16 and 17, on the shafts 10 and 14, the chains 6 and 7 are caused to move in unison, but in opposite directions, so that their parallel inner runs will travel together and in the same direction, whereby the cans may be transported in the space between the inner runways 2 and 4, as hereinafter described.

Each chain 6 and 7 is provided at spaced intervals with pocket members 18, which are mounted on the upper portions of the chain so that the can-ear-carrying portions 19 of these pocket members may project inwardly over the inner flanges of the runways 2 and 4. The inner face of each pocket is curved as at 20, to fit the outer cylindrical surface of one of the cans, and the inner runs of the conveyor chains are spaced at such a distance apart that the diametrically opposed sides of the can will fit easily between a pair of these opposed pocket members, as shown in Figs. 3 and 4. The pocket 21 in each of these members 18 is so shaped as to receive and support one of the ears 22 on the can 23. In this manner, the can will be supported in upright position by its ears in an opposed pair of these pocket members 18, and will be carried along in this position between the runways 2 and 4.

The main horizontal drive shaft 24 carries a pulley 25 at one end from which power is obtained from any suitable source. The vertical drive shaft 26 is driven from shaft 24 thru bevel gears 27 and 28. A second vertical shaft 29 is driven from shaft 26 through the reducing gears 30 and 31. At diametrically opposite points upon the upper surface of gear 31, are mounted two similar pins or rollers 32, which engage in a series of radial slots 33, in a disk 34 carried by a vertical shaft 35 also mounted in the framework 1. A gear 36 on shaft 35 drives the gear 37 on the shaft 10 heretofore described. The continuously revolving pins 32 engage at intervals with the slots 33 to impart an intermittent forward movement to the disk 34, and hence through the gear connections hereinabove described, to the two conveyor chains 6 and 7. Therefore, continuous rotation of the drive shaft 24 will, through the Geneva movement just described, cause the pairs of can-carrying pockets 18 to move forwardly, (toward the left in Figs. 1 and 3), intermittently, resting at fixed intervals at certain stations along the guideways 2 and 4.

A vertical shaft 38 (which drives the bail-placing mechanism D, hereinafter described, through the automatic stop mechanism E,) is driven from shaft 26 by means of the sprocket chain 39 connecting the sprocket 40 on shaft 26 with the sprocket 41 near the lower end of shaft 38. A horizontal shaft 42, extending to the can-feeding mechanism B at the right hand end of the machine, is constantly driven from shaft 38 through the beveled gears 43 and 44.

The can-feeding mechanism B will now be described, referring more particularly to Figs. 2, 4, 5, 6 and 7 of the drawings. At the upper end of shaft 15 is keyed a spur gear 45, which meshes with and drives a similar gear 46 secured at the upper end of a sleeve 47 freely rotatable on shaft 11. A disk 48 (shown in perspective in Fig. 6), is keyed to the lower end of sleeve 47, above the sprocket 9, and an exactly similar disk 49 is keyed to shaft 15 so as to rotate in the same plane as disk 48. Each disk 48 and 49 is provided with a plurality, here shown as three, of spaced substantially semi-circular recesses 50, the disks being so mounted on the shaft 15 and sleeve 47 that two of these recesses 50 will mate with one another above a pair of the ear-receiving pockets 18, when these pockets come to rest at the can-receiving station. Obviously, the arcuate spacing of the recesses 50 from one another in the disk 48 or 49 must be equal to the spacing of the pockets 18 along the conveyor chains 6 and 7. The arcuate recesses 50 will fit freely about the periphery of the can, and at the inner central portion of each recess is a slot 51 through which one of the ears 22 may pass vertically into the pocket 19. Mounted along the edges of each recess 50, and extending upwardly therefrom, is a pair of similar cam guide plates 52, whose inner edges 53 curved downwardly toward one another and blend into the sides of slot 51, so that an ear 22 engaging with either one of these plates 52 will be guided into the slot 51. Mounted on shaft 15 at a distance above the disk 49 equal to the height of ears 22 above the bottom of a cam is a spider 54 having a series of outwardly projecting fingers 55, so positioned that one face thereof will be in vertical alinement with an outer edge of the slot 51 therebeneath.

The cans 23 are delivered to the feeding mechanism along a stationary slideway 56, the cans being pushed along this slideway in single file, resting in upright position upon their bottoms. A belt conveyor 57, driven through belt gearing 58 from a motor 59, serves to deliver the cans to the slideway 56 and to propel the cans along this slideway. An arcuate portion 60 of slideway 56 is centered about shaft 15, and terminates at 61, so that a can pushed off the end 61 of the slideway will fall downwardly into engagement with a pair of pockets 18. The outer vertical wall 62 of slideway 60 is faced with leather or other suitable friction material, so that resistance will be offered to the side walls of a can 23 pushed thereagainst, thus tending to rotate the can about its vertical axis.

A supply of cans 23 is continuously being placed upon the belt conveyor 57 by an operator, or in any other suitable manner. No particular care need be exercised in placing these cans upon the conveyor, and the ears 22 will project in various directions as indicated at the left-hand end of Fig. 4. The cans are continuously urged to the right along this slideway 56, and the foremost can in the line will be forced into one of the recesses 50 in disk 49 when this recess comes in line with the end of slideway 56. As disk 49 continues to rotate in a clockwise direction (Fig. 4), the can 23 will be moved into engagement with the outer vertical leather-faced wall 62, the friction of this engagement tending to rotate the can about its central axis until one of the ears 22 comes into engagement with the finger 55, which will prevent further rotation of the can. As the can nears the end 61 of slideway 60, the other half of the can will be engaged by the mating recess 50 in the other disk 48, and the mechanism will come to rest with the slots 51 in alinement over a pair of pockets 19. The can 23 will now have passed over the end 61 of the stationary slideway 60 and will fall downwardly, the ears 22 being guided by cans 53 into the slots 51 through which they pass downwardly into the recesses 21 in pockets 18. In order to augment the force of gravity and insure the rapid passage of each can downwardly into the pockets in the conveyor, means is provided for injecting a puff of air into the open upper end of the can to force same downwardly. For this purpose, an air pipe 63 projects outwardly over the feeding position of the can, this pipe terminating in a downwardly extending nozzle 63ª. An air supply pipe 64, in which is a cut-off valve 65, leads to an automatically operated valve 66, from which a pipe connection 67 leads to the delivery pipe 63. The operating plunger 68 of valve 66 is normally held outwardly, with the valve in closed position, by spring 69. The head of plunger 68 bears against a cam 70 mounted on the continuously rotating horizontal shaft 42, hereinabove referred to. The rotation of shaft 42 and cam 70 is so timed that plunger 68 will be pushed in to the valve 66, to deliver a puff of air through nozzle 63ª, each time that a can 23 comes into feeding position at the can-receiving station. This puff of air delivered within the can will force same quickly downward into the receiving pockets 18.

It is obvious that if the can is imperfectly formed, or the ears 22 are not properly position upon the can, or lumps of solder or other projections are present upon the outer surface of the can or ears, the can will not be able to pass downwardly through the recesses 50, and slots 51, and will be carried on past the can-feeding station and thrown out at the side of the machine. In such case, as the conveyors 6 and 7 move onward to the bail-placer, there will be a pair of empty pockets 18, and if the bail-placer should operate to deliver a bail to these empty pockets, the operation and the bail will be wasted, and there will be danger of jamming the mechanism. For this reason the automatic-stop mechanism, hereinafter described, is provided to halt the operation of the bail-placer D, wherever the can feeder D has failed for any reason to deliver a can to a pair of pockts 18.

The bail-placing apparatus D, and the mechanism C for feeding the bails thereto, are substantially the same as those disclosed and claimed in the copending application of Chalmers and Wilson, referred to hereinabove, and will not be here described in great detail. The bails 71 are of the usual inverted U-shape, with inturned hooked ends adapted to engage in the can ears. A supply of these bails on a removable and replaceable bail holder 72 is mounted in the machine, and the bails are fed down the inclined holder 72 onto the feeder head 73, by a suitable feeding device not here shown. When a can 23, held in a pair of pockets 18, comes to rest at the bail-receiving station, a bail spreader 74, at the outer end of feeder head 73 moves down into engagement with the pockets 18, and a pusher-bar or plunger 75 engages one of the bails 71 and moves it down over the spreader 74 into engagement with the ears 22 on the can 23. A pair of cam-operated plungers 76, moved by cams 77 on vertical shafts 78, are adapted to force the hooked ends of the bail into engagement with the can ears. The two vertical shafts 78 are connected for simultaneous operation by the sprocket gearing 79, one of the shafts 78 being driven by sprocket chain 80 from the lower end of shaft 38. All of the above bail-positioning mechanism is the same as disclosed and claimed in the prior Chalmers and Wilson application hereinabove referred to, and will not be further described herein. Obviously, numerous variations in the form of bail-placing apparatus employed might be resorted to without affecting the combination of the improved can-feeding mechanism hereinbefore described, and the automatic-stop mechanism for the bail-placer, now to be described.

Referring now more particularly to Figs. 1 and 8 to 11 inclusive, it will be seen that the vertical shaft 81 forms substantially a continuation of the vertical drive shaft 38, the reduced lower end 82 of shaft 81 being journaled in the upper end of shaft 38. The bail spreader 74 and the bail pusher-bar or plunger 75 are operated from the shaft 81 through suitable gearing and lever connections indicated generally at 83. A lower clutch member 84 keyed to the upper end of shaft 38 bears against the under face of an upper clutch member 85 keyed to the lower end of shaft 81. An angular clutch pin 86 (see Fig. 11), is vertically slidable in an aperture 87 in clutch member 85, and is normally pushed downward by a compression spring 88 held in place by a guide pin 89. Guide pin 89 is mounted in an arcuate plate 90 secured to the upper end of clutch collar 85, the lower end of pin 89 fitting in a passage 91 in the clutch pin 86. The upper face of the lower clutch member 84 is provided with a locking recess 92 in which the lower end of clutch pin 86 engages to normally lock the two clutch members 84 and 85 together. One face of recess 92 has an abrupt locking shoulder, but the other face is upwardly inclined as at 93, so that as the driving clutch member 84 rotates in a clockwise direction (Fig. 10), the locking pin 86, spring pressed against the flat upper surface 94 of clutch member 84, will be guided down the incline 93 into the locking recess 92. The pin 86 will be held in this recess by spring 88, and the clutch members will always remain thus in engagement and the two shafts 38 and 81 will rotate as a unit, unless pin 86 is temporarily withdrawn as hereinafter described.

A lever or crank-arm 95 secured to the upper end of shaft 96 normally projects over the upper surface of clutch member 85, this arm being provided at its end with a beveled face 97 adapted to engage under a beveled edge 98 of the horizontal arm 99 of clutch pin 86, thus lifting the pin 86 from the locking recess 92 and disconnecting the clutch members and shafts 38 and 81. A crank-arm 100 at the lower end of shaft 96 is connected by a link 101 with the short arm 102 of a bell crank lever pivoted at 103 in the fixed framework, the longer arm 104 of this bell-crank projecting into the path of travel of the cans 23, when moved to bail placing position by the conveyor chains 6 and 7. A suitable spring means (not shown) holds the lever combination 95 and 104 normally in the full line position of Fig. 8. When a can 23 is moved by the conveyor to the bail-receiving station, the can will engage the lever arm 104 and swing it back to the dotted-line position (Fig. 8), and this movement will, through link 101 and crank arm 100 swing the lever 95 out to the dotted line position to remove it from the path of travel of the horizontal arm 99 of clutch pin 86. The mechanism is so timed that as long as cans 23 are properly positioned in the pockets 18 of the conveyors 6 and 7, the lever arm 95 will be moved out of the path of travel of clutch pin 86 on each revolution of the shafts 38 and 81, which shafts will remain clutched together to operate as a unit, and the periodic operation of the bail-placer will take place whenever a can 23 reaches the bail-receiving position. If, however, for any reason, the can-feeder B has failed to deliver a can to one pair of the pockets 18, and these empty pockets come opposite the lever arm 104, there will be no can to engage this lever, and the clutch releasing apparatus will fail to operate. Therefore the clutch pin 86 will be withdrawn from the locking recess 92, and the connection between shafts 38 and 81 will be broken so that shaft 81 will cease to rotate and no operation of the bail-placer D will take place at this time. The shaft 38 and lower clutch member 84 will rotate freely for one revolution, and in the meantime the following can 23 will be moved against the lever arm 104 and withdraw the releasing lever 95 from beneath the clutch member 86, so that this spring-clutch pin will slide down the inclined cam surface 93 into the locking recess 92 and against clutch shaft 81 to the driving shaft 38. The bail-placer will then be again operated to position a bail upon this can 23 which has operated the releasing lever 104. It will thus be seen that the bail-placer D will only function when a can 23 is moved into bail-placing position, so that there will be no loss of bails 71, and the possibility of jamming the mechanism by an attempt to place a bail when no can is in bail-receiving position.

The mechanism F for removing the assembled cans and bails comprises a continuously moving belt conveyor onto which the cans drop after being released from the pockets 18 when these pockets separate at the left-hand end of their travel as shown in Figs. 1 and 3.

It will be noted that the present invention comprises an improved means for feeding cans continuously to a bail-placing machine, and cooperating means for regulating the operation of the bail placer so that this mechanism will not function when the can feeder has failed for any reason to deliver a can to the bail-receiving position. While this improved mechanism is particularly designed for use with the specific form of bail-placer here shown, and disclosed and claimed in greater detail in the Chalmers and Wilson application hereinabove referred to, the new and improved can-feeder and automatically controlled drive for the bail-placer could obviously be used with other types of bail-placer, without affecting the operation of these new features in any way. Also, the new can feeder, and the automatic-stop mechanism could be used in connection with other can-manipulating or treating mechanisms, than a bail-placer. It is immaterial, in so far as the present invention is concerned, what operation is performed on the can at the station under apparatus D.

I claim:

1. An apparatus for feeding cans provided with bail-ears, comprising a conveyor having ear-receiving pockets, means for intermittently advancing the conveyor, a support for the cans terminating above a station at which the pockets halt, rotating means having can-engaging recesses for propelling the cans over the support, there being an enlargement in each recess to permit a can-ear to pass downward therethrough into one of the pockets, and guides on the rotating means to direct the ear into the enlargement.

2. An apparatus for feeding cans provided with bail-ears, comprising a conveyor having ear-receiving pockets, means for intermittently advancing the conveyor, a support for the cans terminating above a station at which the pockets halt, rotating means having can-engaging recesses for propelling the cans over the support, there being an enlargement in each recess to permit a can-ear to pass downward therethrough into one of the pockets, and guide plates on the rotating means which diverge upwardly from the sides of the enlargement to direct the ear into the pocket.

3. An apparatus for feeding cans provided with bail-ears, comprising a conveyor having ear-receiving pockets, means for intermittently advancing the conveyor, a support for the cans terminating above a station at which the pockets halt, rotating means having can-engaging recesses for propelling the cans over the support, there being an enlargement in each recess to permit a can-ear to pass downward therethrough into one of the pockets, an ear-engaging finger positioned above the recess, means for rotating the can until the ear engages the finger, and guides on the rotating means to direct the ear downwardly through the recess enlargement.

4. A can-feeding mechanism comprising a support for the cans, means for propelling the cans along the support, and means for successively rotating each can about its longitudinal axis to a predetermined position before it is delivered from the support.

5. A can-feeding mechanism comprising a support for the cans, means for propelling the cans along the support, and means for successively rotating each can about its longitudinal axis to a predetermined position.

6. A mechanism for feeding cans provided with bail-ears to a conveyor having ear-receiving pockets comprising a support for the cans, means for propelling the cans along the support toward the conveyor, and means for guiding the ears into the pockets.

7. A mechanism for feeding cans provided with bail-ears to a conveyor having ear-receiving pockets comprising means for propelling the cans toward the conveyor, and means timed with the conveyor for guiding the cans one at a time to the conveyor so that the ears engage within the pockets.

8. A mechanism for feeding cans provided with bail-ears to a conveyor having ear-receiving pockets comprising means for propelling the cans toward the conveyor, and means for re-positioning the cans so that the ears will engage with the pockets.

9. An apparatus for feeding cans provided with bail-ears to a can-manipulating machine, comprising a support for the cans, means for propelling the cans along the support, means provided with ear-receiving pockets to which the cans are delivered, and means for rotating each can as it is moved along the support to aline the ears with the pockets.

10. An apparatus for feeding cans provided with bail-ears to a can-manipulating machine, comprising a support for the cans, means for propelling the cans along the support, means provided with ear-receiving pockets to which the cans are delivered, and means for guiding the bail-ears into the pockets.

11. An apparatus for feeding cans provided with bail-ears to a can-manipulating machine, comprising a support for the cans, means for propelling the cans along the support, means provided with ear-receiving pockets to which the cans are delivered, means for forcing a can from the support toward the pockets, and means for alining the ears with the pockets.

12. An apparatus for feeding cans provided with bail-ears to a can-manipulating machine, comprising a support for the cans, means for propelling the cans along the support, means provided with ear-receiving pockets to which the cans are delivered, means for forcing a can from the support toward the pockets, and means for guiding the ears into the pockets.

13. An apparatus for feeding cans provided with bail-ears to a can-manipulating machine, comprising a support for the cans, means for propelling the cans along the support, means provided with ear-receiving pockets to which the cans are delivered, means for injecting air under pressure into the can to force it from the support toward the pockets, a control valve in the air-delivering means, and valve-operating means timed with the can-propelling means.

14. A mechanism for feeding cans provided with bail-ears, comprising a conveyor having ear-receiving pockets, means for intermittently advancing the conveyor, a support for the cans terminating above a station at which the pockets halt, means for delivering cans to the support, and means timed with the conveyor advancing mechanism for moving a can along the support and delivering it to the pockets.

15. A mechanism for feeding cans provided with bail-ears, comprising a conveyor having ear-receiving pockets, means for intermittently advancing the conveyor, a support for the cans terminating above a station at which the pockets halt, means for delivering cans to the support, means timed with the conveyor advancing mechanism for moving a can along the support and delivering it to the pockets, and cooperating means for rotating the can about its axis until the ears are alined with the pockets.

16. A mechanism for feeding cans provided with bail-ears, comprising a conveyor having ear-receiving pockets, means for intermittently advancing the conveyor, a support for the cans terminating above a station at which the pockets halt, means for delivering cans to the support, rotating means having can engaging recesses for propelling the cans to and over the end of the support, and means for alining the ears with the pockets.

17. A mechanism for feeding cans provided with bail-ears, comprising a conveyor having ear-receiving pockets, means for intermittently advancing the conveyor, a support for the cans terminating above a station at which the pockets halt, means for delivering cans to the support, rotating means having can engaging recesses for propelling the cans to and over the support, and means for rotating the can about its longitudinal axis to a predetermined position in the recess.

18. A mechanism for feeding cans provided with bail-ears, comprising a conveyor having ear-receiving pockets, means for intermittently advancing the conveyor, a support for the cans terminating above a station at which the pockets halt, means for delivering cans to the support, rotating means having can-engaging recesses for propelling the cans to and over the end of the support, an ear-engaging finger positioned above each recess, and a can-engaging means which rotates the can in the recess until an ear engages with the finger.

19. A mechanism for feeding cans provided with bail-ears, comprising a conveyor having ear-receiving pockets, means for intermittently advancing the conveyor, a support for the cans terminating above a station at which the pockets halt, means for delivering cans to the support, a rotating disk having spaced can-engaging recesses for propelling the cans to and over the end of the support, there being an enlargement in each recess to permit the passage therethrough of a can-ear into one of the pockets, and means for rotating the can in the recess until the ear is in alinement with the enlargement.

20. A mechanism for feeding cans provided with bail-ears, comprising a conveyor having ear-receiving pockets, means for intermittently advancing the conveyor, a support for the cans terminating above a station at which the pockets halt, means for delivering cans to the support, a rotating disk having spaced can-engaging recesses for propelling the cans to and over the end of the support, there being an enlargement in each recess to permit the passage therethrough of a can-ear into one of the pockets, an ear-engaging finger positioned above the disk, and means for rotating the can until an ear engages with the finger.

21. A mechanism for feeding cans provided with bail-ears, comprising a conveyor having ear-receiving pockets, means for intermittently advancing the conveyor, a support for the cans terminating above a station at which the pockets halt, means for delivering cans to the support, a rotating disk having spaced can-engaging recesses for propelling the cans to and over the end of the support, there being an enlargement in each recess to permit the passage therethrough of a can-ear into one of the pockets, an ear-engaging finger positioned above the disk, means for rotating the can until an ear engages with the finger, and means for forcing the can from the disk into the conveyor pockets.

22. A mechanism for feeding cans provided with bail-ears, comprising a conveyor having ear-receiving pockets, means for intermittently advancing the conveyor, a support for the cans terminating above a station at which the pockets halt, means for delivering cans to the support, a rotating disk having spaced can-engaging recesses for propelling the cans to and over the end of the support, there being an enlargement in each recess to permit the passage therethrough of a can-ear into one of the pockets, an ear-engaging finger positioned above the disk, means for rotating the can until an ear engages with the finger, and means for delivering air under pressure into the can to force it through the disk into the conveyor pckets.

23. In combination with a conveyor for receiving cans, means for moving cans at spaced intervals to the conveyor comprising an air-nozzle, and means for delivering air therethrough into the can, including an air-valve, and valve operating means driven in timed relation with the conveyor.

24. In combination with a conveyor for receiving cans, means for moving cans at spaced intervals to the conveyor comprising an air-nozzle, means for delivering air therethrough into the can, including an air-valve, a valve operating cam, and a rotary cam-shaft driven in timed relation with the conveyor.

25. In a can-treating mechanism, a conveyor for successively moving cans from a can-receiving station to a station where an operation is performed upon the can, means at the first station for positioning cans on the conveyor, means at the second station for operating upon the can, actuating connections for the operating means, and means for temporarily rendering the actuating connections inoperative whenever a can has not been brought into register with the operating means.

26. In a machine for placing bails on cans, a conveyor for successively moving cans from a can-receiving station to a bail-placing station, means for feeding cans to the conveyor and positioning them thereon in bail-receiving position, a bail-placer, means for actuating the bail-placer, and means for temporarily disabling the actuating means when the can-feeder has failed to position a can on the conveyor.

27. In a machine for placing bails on cans, a conveyor for successively moving cans from a can-receiving station to a bail-placing station, means for positioning cans on the conveyor, a bail-placer, means for actuating the bail-placer, and means for temporarily disabling the actuating means whenever a can has not been placed in bail-receiving position.

28. In combination, a mechanism for performing an operation on a can, a conveyor for advancing cans in succession to the operating mechanism, means for actuating the operating mechanism as a can comes into register therewith, and means for preventing the actuation of the operating means unless a can is brought into register therewith.

29. In combination, a mechanism for performing an operation on a can, a conveyor for advancing cans in succession to the operating mechanism, means for actuating the operating mechanism as a can comes into register therewith, said actuating means including a normally engaged clutch, a clutch-releasing means, and means actuated by a can as it moves into register with the operating mechanism for temporarily rendering the clutch releaser inoperative.

30. In a machine for placing bails on cans, a bail-placing mechanism, a conveyor for advancing cans in succession to the bail-placer, driving connections for actuating the bail-placer as a can comes into register therewith, and means for preventing the operation of the driving means unless a can is brought into register with the bail-placer.

31. In a machine for placing bails on cans, a bail-placing mechanism, a conveyor for advancing cans in succession to the bail-placer, driving connections for actuating the bail-placer as a can comes into register therewith, a normally engaged clutch in the driving connections, and means for releasing the clutch unless a can is in register with the bail-placer.

32. In a machine for placing bails on cans, a bail-placing mechanism, a conveyor for advancing cans in succession to the bail-placer, driving connections for actuating the bail-placer, as a can comes into register therewith, a normally engage clutch in the driving connections, means for releasing the clutch, and means operating by a can as it moves into register with the bail-placer for rendering the clutch-releaser inoperative.

33. In a machine for placing bails on cans, a bail-placing mechanism, a conveyor for advancing cans in succession to the bail-placer, driving connections for actuating the bail-placer as a can comes into register therewith, a clutch in the driving connections comprising a pair of clutch members and a spring-pressed pin normally connecting the clutch members and automatically reengaging when released after a free revolution of one of the clutch members, means for releasing the clutch, and means for temporarily moving the clutch-releaser out of operating position when a can moves into register with the bail-placer.

34. In a machine for placing bails on cans, a bail-placing mechanism, a conveyor for advancing cans in succession to the bail-placer, driving connections for actuating the bail-placer as a can comes into register therewith, a clutch in the driving connections comprising a pair of opposed clutch members, one of which has a pin-engaging recess with one abrupt face and one beveled face, a spring-pressed clutch-pin mounted in the other member and normally engaging in the recess, a member adapted to engage the pin and withdraw it from the recess, and connections adapted to be engaged by a can as it moves into register with the bail-placer for moving the member out of pin-releasing position.

GEORGE W. CHALMERS.

Certificate of Correction.

It is hereby certified that in Letters Patent No. 1,600,452, granted September 21, 1926, upon the application of George W. Chalmers, of Summit, Illinois, for an improvement in "Can-Feeding Mechanism," errors appear requiring correction as follows: Page 3, line 43, for the word "cans" read *cams*, and line 91, for the word "wherever" read *whenever;* and that the said Letters Patent should be read with these corrections therein that the same may conform to the record of the case in the Patent Office.

Signed and sealed this 16th day of November, A. D. 1926.

[SEAL.]

M. J. MOORE,
*Acting Commissioner of Patents.*